L. COLE.
APPARATUS FOR STRETCHING FELT-JACKETS FOR ROLLERS
IN PAPER-MACHINES.

No. 194,582. Patented Aug. 28, 1877.

WITNESSES:
A. W. Almquist
J. H. Scarborough

INVENTOR:
L. Cole
BY Munn & Co
ATTORNEYS.

UNITED STATES PATENT OFFICE.

LUTHER COLE, OF CORINTH, NEW YORK.

IMPROVEMENT IN APPARATUS FOR STRETCHING FELT JACKETS FOR ROLLERS IN PAPER-MACHINES.

Specification forming part of Letters Patent No. 194,582, dated August 28, 1877; application filed June 30, 1877.

*To all whom it may concern:*

Figure 1:
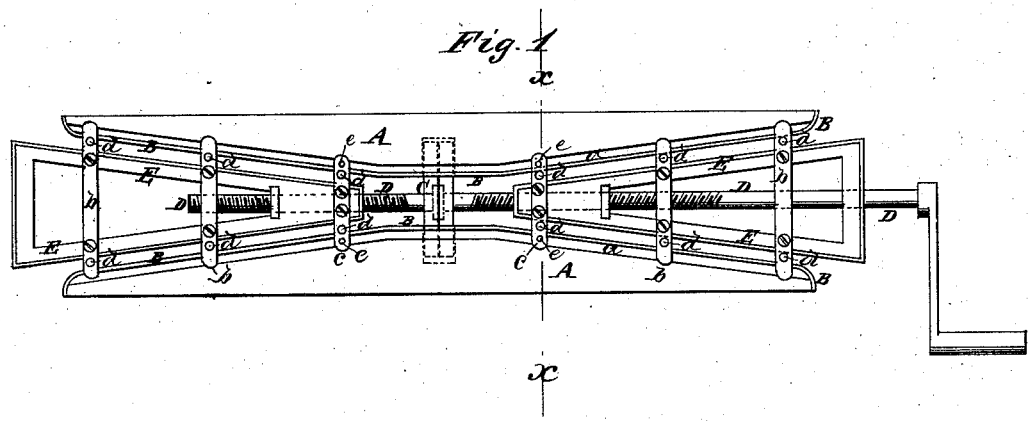
Figure 2:
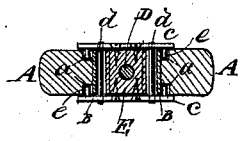

Be it known that I, LUTHER COLE, of Corinth, in the county of Saratoga and State of New York, have invented a new and Improved Felt-Jacket Stretcher, of which the following is a specification:

Figure 1 is a plan view. Fig. 2 is a transverse section on line $x\ x$ in Fig. 1.

Similar letters of reference indicate corresponding parts.

My invention relates to apparatus for stretching felt covers for couch and other rolls in a paper-machine; and it consists of two tapered bars and two oppositely-arranged wedges placed between the tapered bars, and operated by a spindle having cut upon it a right-and-left-hand screw-thread for moving the wedges simultaneously in opposite directions, so as to spread the tapered bars upon which the jacket is placed.

In the drawing, A A are similar bars of wood, having their inner edges tapered from the center each way toward their ends. Both edges of the inner surface of the bars are rabbeted, and upon the said inner surface a plate of iron, B, is fixed, which is of the full width of the bars A, and forms, together with the rabbet, a groove, $a$.

C C are bars, which are fitted to a mortise in each of the bars A, and are bored to receive the spindle D, and chambered out on the inner surfaces to receive a collar on the spindle D. This spindle, upon one side of the bars C, has formed on it a right-hand screw-thread, and upon the other side a left-hand thread.

Wedges E are placed on the spindle D, between the bars A, and are provided with suitable nuts for engaging the threads on the spindle. Transverse bars $b\ b$ and $c$ are attached to the wedges by bolts, and extend over the groove $a$ in the bars A.

In all of the bars rollers $d$ are journaled, which roll on the surface of the plate B when the wedges are drawn together by turning the spindle D, and the bars $c$ are provided with pins or rollers $e$, that project into the groove $a$, for the purpose of drawing the bars together when the wedges are retracted. A crank, F, is attached to the spindle D, for turning it.

The felt jacket to be stretched is drawn over the bars A A when the instrument is contracted. The bars are spread by drawing between them the wedges E by turning the threaded spindle D. The bars A, the outer edges of which are parallel, stretch the jacket evenly and uniformly throughout its length.

Having thus described my invention, I claim as new and desire to secure by Letters Patent—

The bars A, having tapered ends, and provided with plates B, the cross-bars C, wedges E, having cross-bars $b\ c$, the rollers $d$, and the spindle D, having right and left hand threads, in combination, substantially as shown and described.

LUTHER COLE.

Witnesses:
A. M. YOUNG,
P. J. RANDALL.